United States Patent [19]

Shibahara

[11] Patent Number: 5,748,913
[45] Date of Patent: May 5, 1998

[54] COMPUTER SYSTEM CAPABLE OF TRANSFERRING VIDEO DATA BETWEEN CARD DEVICES

[75] Inventor: Akihiko Shibahara, Tokyo, Japan

[73] Assignee: Kabushiki Kaisha Toshiba, Kawasaki, Japan

[21] Appl. No.: 712,326

[22] Filed: Sep. 11, 1996

[30] Foreign Application Priority Data

Feb. 29, 1996 [JP] Japan ............................. 8-042918

[51] Int. Cl.⁶ ............................................ G06F 9/00
[52] U.S. Cl. ............... 395/282; 395/306; 395/309; 395/834; 395/858; 395/883
[58] Field of Search ...................... 395/280, 281, 395/282, 287, 306, 308, 309, 526, 828, 834, 858, 883; 364/DIG. 1, 240, 240.2, 240.5; 345/201

[56] References Cited

U.S. PATENT DOCUMENTS

| | | |
|---|---|---|
| 4,688,168 | 8/1987 | Gudaitis et al. ............. 364/200 |
| 5,241,631 | 8/1993 | Smith et al. ................. 395/325 |
| 5,485,535 | 1/1996 | Arimoto ...................... 382/305 |
| 5,568,165 | 10/1996 | Kimura ...................... 345/185 |
| 5,630,174 | 5/1997 | Stone, III et al. ............ 395/883 |
| 5,634,040 | 5/1997 | Her et al. .................... 395/502 |
| 5,666,545 | 9/1997 | Marshall et al. .............. 395/304 |
| 5,682,484 | 10/1997 | Lambrecht ................... 395/308 |

FOREIGN PATENT DOCUMENTS

6-243095  9/1994  Japan .

*Primary Examiner*—Jack B. Harvey
*Assistant Examiner*—Xuan M. Thai
*Attorney, Agent, or Firm*—Finnegan, Henderson, Farabow, Garrett & Dunner, L.L.P.

[57] ABSTRACT

A PC card device controller has a local bus for realizing a direct path function to directly connect first and second two card sockets to each other, in addition to a ZV port path. In a multimedia mode, video data are directly transferred between PC card devices via the local bus without the mediacy of a system bus. Therefore, the transfer efficiency of video data between PC cards is increased.

18 Claims, 11 Drawing Sheets

FIG. 1

| PC CARD PIN NUMBER | PC CARD-16 | ZV PORT MODE |
|---|---|---|
| 8 | A10 | HREF |
| 10 | A11 | VSYNC |
| 11 | A9 | Y0 |
| 12 | A8 | Y2 |
| 13 | A13 | Y4 |
| 14 | A14 | Y6 |
| 19 | A16 | UV2 |
| 20 | A15 | UV4 |
| 21 | A12 | UV6 |
| 22 | A7 | SCLK |
| 23 | A6 | MCLK |
| 24::25 | A[5::4] | RESERVED |
| 26::29 | A[3::0] | ADDRESS[3::0] |
| 33 | IOIS16# | PCLK |
| 46 | A17 | Y1 |
| 47 | A18 | Y3 |
| 48 | A19 | Y5 |
| 49 | A20 | Y7 |
| 50 | A21 | UV0 |
| 53 | A22 | UV1 |
| 54 | A23 | UV3 |
| 55 | A24 | UV5 |
| 56 | A25 | UV7 |
| 60 | INPACK# | LRCLK |
| 62 | BVD2/SPKR# | SDATA |

| PIN NUMBER | PC Card-32 | ZV PORT MODE |
|---|---|---|
| 2 | CAD0 | Y0 |
| 3 | CAD1 | Y2 |
| 4 | CAD3 | Y4 |
| 5 | CAD5 | Y6 |
| 6 | CAD7 | Y7 |
| 8 | CAD9 | UV2 |
| 9 | CAD11 | UV3 |
| 10 | CAD12 | UV5 |
| 11 | CAD14 | UV7 |
| 22-25 | CAD18, 20, 21, 22 | Reserved |
| 30 | CAD27 | PWM RIGHT |
| 31 | CAD29 | PWM LEFT |
| 37 | CAD2 | Y1 |
| 38 | CAD4 | Y3 |
| 39 | CAD6 | Y5 |
| 41 | CAD8 | UV0 |
| 42 | CAD10 | UV1 |
| 44 | CAD13 | UV4 |
| 45 | CAD15 | UV6 |
| 55 | CAD17 | HREF |
| 56 | CAD19 | VSYNC |
| 66 | CAD31 | PCLK |

CARD ADDRESS OF ENCODER CARD

| CARD ADDRESS | CONTENTS |
|---|---|
| 0x00 | CONFIGURATION REGISTER (SETTING OF ENCODE PARAMETER AND THE LIKE) |
| 0x01 | OPERATION STATUS REGISTER |
| 0x02 | COMMAND REGISTER |
| 0x03 | OUTPUT FIFO READ REGISTER |
| 0x04 | YUV DATA WRITE REGISTER (EFFECTIVE IN PC-CARD MODE) |

F I G. 1 2

COMMAND CODE AND SET VALUE SET IN CONFIGURATION

| COMMAND CODE | SET CONTENTS | SET VALUE |
|---|---|---|
| 0x00000001 | SCREEN SIZE:WIDTH | NUMBER OF DOTS OF SCREEN WIDTH |
| 0x00000002 | SCREEN SIZE:HEIGHT | NUMBER OF DOTS OF SCREEN HEIGHT |
| 0x00000003 | FRAME REPRODUCTION RATE (fps) | =0010 0000 0000 0000 (24 fps)<br>0011 0000 0000 0000 (25 fps)<br>0100 0000 0000 0000 (29.97fps)<br>0101 0000 0000 0000 (30 fps) |
| 0x00000004 | VIDEO BIT RATE (bit/sec) | DATA AMOUNT TRANSFERRED FOR ONE SECOND f (bit/sec) |
| 0x00000005 | GOP STRUCTURE | =0001 0000 0000 0000 (I STRUCTURE)<br>0010 0000 0000 0000 (IBBP STRUCTURE)<br>0011 0000 0000 0000 (IP STRUCTURE) |
| 0x00000006 | NUMBER OF ENCODE FRAMES | NUMBER OF FRAMES TO BE ENCODED |
| 0x00000007 | LAYER NUMBER | =0011 0000 0000 0000 {Layer 1}<br>0010 0000 0000 0000 {Layer 2}<br>0001 0000 0000 0000 {Layer 3} |
| 0x00000008 | AUDIO BIT RATE (kbit/sec) | DATA AMOUNT TRANSFERRED FOR ONE SECOND (kbit/sec) |
| 0x00000009 | SAMPLING FREQUENCY | =0001 0000 0000 0000 (44.1 KHz)<br>0010 0000 0000 0000 (48 KHz)<br>0011 0000 0000 0000 (32 KHz) |
| 0x0000000A | AUDIO MODE | =0001 0000 0000 0000 (stereo)<br>0010 0000 0000 0000 (joint-stereo)<br>0011 0000 0000 0000 (dual-channel)<br>0100 0000 0000 0000 (single-channel) |

F I G. 13

COMPUTER SYSTEM CAPABLE OF TRANSFERRING VIDEO DATA BETWEEN CARD DEVICES

BACKGROUND OF THE INVENTION

1. Field of the Invention

The present invention relates to a computer system capable of transferring video data between card devices and, more particularly, to a computer system having a card device controller with a dedicated bus for transferring video/audio data between two card devices at a high speed.

2. Description of the Related Art

In recent years, many equipments have PC card sockets that comply with the standard specifications of PCMCIA (Personal Computer Memory Card International Association) as a standardization organization in the United States, and the standard specifications of JEIDA (Japan Electronic Industry Development) in Japan. Various studies have been made so as to use PC cards as a video capture card for controlling input/output of moving image data, a MPEG (Motion Picture Expert Group) decoder card, and the like in these equipments.

To efficiently process a large amount of data such as moving image data, a system architecture using a PCI (Peripheral Component Interconnect) local bus capable of high-speed data transfer is widely being used in a personal computer.

However, the data transfer rate obtained is limited even if the PCI local bus is used. For this reason, when a PC card is used as a video capture card or a MPEG decoder card, as described above, the PCI local bus is still unsatisfactory in terms of data transfer rate.

Recently, therefore, a technique of directly connecting a PC card to a video controller via a bus (to be referred to as a ZV port bus hereinafter) for moving image data only, which corresponds to a standard called a ZV (Zoomed Video) port, has been developed. The ZV port can directly output video/audio data to a video controller/audio controller without using the system bus. With the use of the ZV port, long-time occupation of the system bus due to the transfer of a large amount of video data can be eliminated, and the video processing performance of the system can be improved.

However, the ZV port bus is a bus for transferring video/audio data in a single direction from the PC card to the video controller/audio controller. The ZV port bus is effective for display and reproduction of the video data, but cannot be used for video data transfer between PC cards. For this reason, when a moving image encoder system is to be constructed by using a PC card, even a personal computer with the ZV port bus has the following problem.

More specifically, when a moving image encoder system using a PC card is to be constructed in a personal computer, a capture card for externally receiving a video signal/audio signal in, e.g., a NTSC (National Television System Committee) format and converting it to digital data, and an encoder card for compressing the digital video/audio data obtained from the capture card are required.

The digital video/audio data can be compressed in a software manner. However, when high-efficiency compression coding corresponding to MPEG1, MPEG2, and the like is to be performed, it is difficult to receive a video signal while encoding it in real time with the current performance of a personal computer. Therefore, it is more practical to perform acceleration by hardware using an encoder card.

When the above-described capture and encoder cards are used, the system bus is used for transfer of video/audio data from the capture card to the encoder card. In this case, the amount of video data transferred onto the system bus is calculated as follows.

Assuming that a moving image of MPEG1 (screen size: 352×240 dots) is to be compressed, since MPEG1 (screen size: 352×240 dots) has the 4:2:0 image format, the data amount transferred per second is $$352\times240\times1.5\times30fps=3.7\ Mbyte/sec$$

where fps is the frame rate.

Assuming that a moving image of MPEG2 (screen size: 720×480 dots) is to be compressed, since MPEG2 has the 4:2:2 image format, the data amount transferred per second is $$720\times480\times2\times30fps=20\ Mbyte/sec$$

The maximum data amount that can be transferred on existing system buses is 8 Mbyte/sec for an ISA (Industrial Standard Architecture) bus, and 133 Mbyte/sec for a PCI bus. For this reason, it is difficult to realize an encoder system of MPEG2 by a system of ISA bus specifications. Additionally, even in a personal computer system adopting the PCI bus, the system bus is occupied by transfer of video data for a long period of time, resulting in a degradation in performance of the whole system.

SUMMARY OF THE INVENTION

It is, therefore, an object of the present invention to provide a computer system which is capable of directly transferring video data and the like between PC cards without the mediacy of the system bus, and is suitable for construction of a video processing system using a plurality of PC cards, and particularly of a moving image encoder system.

According to the first aspect of the present invention, there is provided a computer system having first and second card sockets respectively capable of receiving card devices, comprising a system bus; and a card device controller connected to the system bus to control the card devices respectively inserted in the first and second card sockets, the card device controller including switch means capable of electrically connecting the first card socket to the second card socket.

According to the second aspect of the present invention, there is provided a computer system having first and second card sockets respectively capable of receiving card devices, comprising a system bus; and a card device controller connected to the system bus to control the card devices respectively inserted in the first and second card sockets, the card device controller including switch means capable of switching between a first mode for electrically connecting at least one of the first card socket and the second card socket to the system bus, and a second mode for electrically connecting the first card socket to the second card socket.

According to the third aspect of the present invention, there is provided a computer system having first and second card sockets respectively capable of receiving card devices handling video/audio data, comprising a system bus; a video/audio bus for transferring the video/audio data; and a card device controller connected to the system bus and the video/audio bus to control the card devices respectively inserted in the first and second card sockets, the card device controller including switch means capable of switching between a first mode for forming a path to electrically connect at least one of the first card socket and the second card socket to the system bus, and a second mode for forming a path to electrically connect one of the first and second card sockets to the video/audio bus.

In this system, the card devices respectively inserted in the first and second card sockets may have attribute data representing one of the first and second modes. In this case, this system desirably comprises means for setting the switch means to a corresponding one of the first and second modes with reference to the attribute data of the card devices respectively inserted in the first and second card sockets.

Each of the card devices respectively inserted in the first and second card sockets may have attribute data representing one of input and output modes related to input/output of data. In this case, this system may further comprise means for setting each of the cards to a corresponding one of the input and output modes with reference to the attribute data of the card devices respectively inserted in the first and second card sockets.

A card device inserted in one of the first and second card sockets is, e.g., a video capture card for receiving an externally input video/audio signal, digitizing the video/audio signal, and outputting the digitized video/audio signal, or an encoder card for compressing and encoding the digitized video/audio data. In this case, the switch means transmits the video/audio data from the video capture card to the encoder card and the video/audio bus in the second mode.

The switch means may have a two-way transmission circuit capable of switching a direction of data transferred between the first and second card sockets. In this case, the two-way transmission circuit has two 3-state buffers arranged parallel in directions different from each other.

The card device controller may comprise a 16-bit circuit for controlling a 16-bit card device, and a 32-bit circuit for controlling a 32-bit card device. In this case, the card devices respectively inserted in the first and second card sockets desirably have attribute data representing one of a 16-bit type and a 32-bit type. This system desirably further comprises means for driving a corresponding one of the 16-bit and 32-bit circuits with reference to the attribute data of the cards respectively inserted in the first and second card sockets.

The video/audio bus is, e.g., a ZV (Zoomed Video) port bus. In this case, this system may further comprise a video controller for controlling the video data transferred from the video/audio bus, or an audio controller for controlling the audio data transferred from the video/audio bus.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

An embodiment of the present invention will be described with reference to the accompanying drawings.

Figure 1:
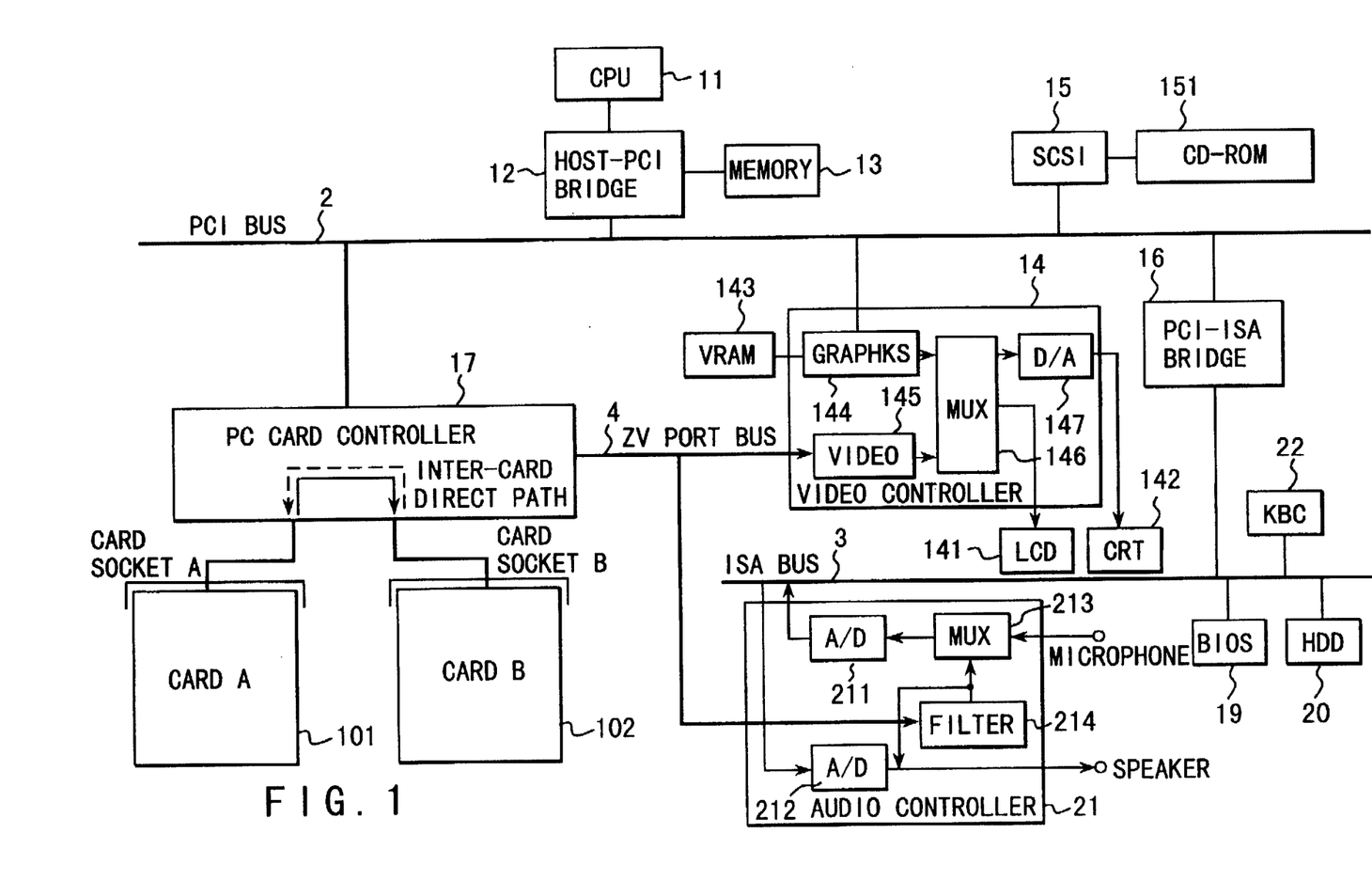
FIG. 1 is a block diagram showing the arrangement of a computer system according to an embodiment of the present invention.

FIG. 1 shows the arrangement of a computer system according to an embodiment of the present invention. This computer system is a notebook type or laptop type portable computer which can be driven by a battery. A processor bus 1, an internal PCI bus 2, an internal ISA bus 3, and a ZV port bus 4 are mounted on the system board. The ZV port bus 4 is a video-audio bus which directly connects a PC card controller 17 to a video controller 14 and an audio controller 21 in a point-to-point manner.

A CPU 11, a host-PCI bridge device 12, a memory 13, the video controller 14, a SCSI controller 15, an internal PCI-ISA bridge device 16, the PC card controller 17, a BIOS ROM 19, a HDD 20, the audio controller 21, a keyboard controller (KBC) 22, and the like are mounted on the system board.

The CPU 11 is realized by, e.g., a microprocessor "Pentium" available from Intel Corporation in the United States. A processor bus 1 directly connected to the I/O pin of the CPU 11 has a 64-bit data bus.

The memory 13 is a memory device for storing operating systems, device drivers, application programs to be executed, processing data, and the like, and is constituted by a plurality of DRAM modules. The memory 13 is constituted by a system memory mounted on the system board in advance, and an expanded memory mounted by a user, as needed. The DRAM modules constituting these system and expanded memories include a synchronous DRAM, a RAM bus, and the like.

The host-PCI bridge device 12 is a bridge LSI bridging the processor bus 1 and the internal PCI bus 2, and functions as one of bus masters of the internal PCI bus 2. The host-PCI bridge device 12 has a function of converting a bus cycle related to transfer of data and addresses between the processor bus 1 and the internal PCI bus 2 in a two-way manner, a function of controlling access to the memory 13 via a memory bus, and the like.

The internal PCI bus 2 is a clock synchronization I/O bus. All cycles on the internal PCI bus 2 are synchronized with the PCI bus clocks. The maximum frequency of the PCI bus clocks is 33 MHz. The PCI bus 2 has an address/data bus used time-divisionally. This address/data bus has a 32-bit width.

The data transfer cycle on the internal PCI bus 2 is constituted by an address phase and one or more data phases subsequent thereto. In the address phase, an address and a transfer type are output. In the data phase, 8-bit, 16-bit, 24-bit, or 32-bit data are output.

The video controller 14 is one of the bus masters of the PCI bus 2, like the host-PCI bridge device 12. The video controller 14 displays image data in a video memory (VRAM) 143 on a LCD 141 or an external CRT display 142, and supports text and graphics displays of VGA (Video Graphics Array) specifications, and also moving image displays.

As shown in FIG. 1, the video controller 14 has a graphics display control circuit 144, a video display control circuit 145, a multiplexer 146, a D/A converter 147, and the like.

The graphics display control circuit 144 is a VGA compatible graphics controller, which converts VGA graphics data drawn on the video memory (VRAM) 143 into RGB video data and outputs the RGB video data. The video display control circuit 145 has a video buffer for storing digital video data (digital YUV data) transferred via the ZV port bus 4, a YUV-RGB conversion circuit for converting the YUV data stored in this buffer into RGB video data, and the like.

The multiplexer 146 selects one of output data from the graphics display control circuit 144 and output data from the video display control circuit 145, or synthesizes a video output from the video display control circuit 145 with VGA graphics data from the graphics display control circuit 144 to send the synthesized data to the color LCD 141 and the D/A converter 147. The D/A converter 147 converts the video data from the multiplexer 146 into an analog RGB signal and outputs the analog RGB signal to the CRT display 142.

The internal PCI-ISA bridge device 16 is a bridge LSI bridging the internal PCI bus 2 and the internal ISA bus 3, and functions as one of PCI devices. The internal PCI-ISA bridge device 16 incorporates a PCI bus arbiter, a DMA controller, and the like. The internal ISA bus 3 is connected to the BIOS ROM 19, the HDD 20, the audio controller 21, the keyboard controller 22, and the like.

The audio controller 21 performs I/O control of audio data under the control of the CPU 11. The audio controller 21 is constituted by an A/D converter 211 for A/D-converting an audio signal from a microphone terminal, a D/A converter 212 for outputting digital audio data as an analog signal from the CPU 11 to a speaker terminal, a filter circuit 214 for converting digital audio data supplied from a PC card via the ZV port bus 4 to an analog signal and outputting the analog signal to the speaker terminal, and a multiplexer 213 for selecting or synthesizing and outputting the output from the filter circuit 214 and the audio signal from the microphone terminal.

The PC card controller 17 is one of the PCI devices. The PC card controller 17 controls a 16-bit PC card (or a PC card-16) of PCMCIA specifications and a 32-bit PC card (or a PC card-32) of Card Bus specifications under the control of the CPU 11, and also controls a PC card of ZV port specifications.

Further, the PC card controller 17 has a local bus for connecting two card sockets A and B to each other in a two-way manner, and a direct path function of directly transferring video data and audio data between two cards A and B via this local bath.

The PC card controller 17 has two operation modes of a normal mode and a multimedia mode (ZV port mode). The normal mode is for controlling a normal PC card such as a modem card. In this mode, data are transferred between the PCI bus 2 and a PC card, and the ZV port bus and the local bus are not used.

The multimedia mode (ZV port mode) is a mode used when a PC card which treats a moving image, such as a video capture card, a MPEG encoder card, and a MPEG decoder card, is inserted in the PC card socket. In this mode, at least one of the ZV port bus and the local bus described above is used. The multimedia mode has two states of IN and OUT states used for defining the data transfer direction between cards via the local bus, and these states are set for the PC cards A and B, respectively.

For example, assume that a video capture card for externally receiving a video/audio signal in the NTSC format, digitizing this signal, and outputting the digitized signal is inserted as the card A in the card socket A, and a MPEG encoder card for compressing and encoding the digitized video/audio data is inserted as the card B in the card socket B. In this case, the card socket A is set in the OUT state of the multimedia mode, and the card socket B is set in the IN state of the multimedia mode. The ZV port bus and the local bus are used as follows.

More specifically, the PC card controller 17 directly transfers the digital video data (digital YUV data) and the digital audio data which are output from the video capture card to the video controller 14 and the audio controller 21 via the ZV port bus 4. At the same time, the PC card controller 17 directly transfers the digital video data (digital YUV data) and the digital audio data which are output from the video capture card to the MPEG encoder card via the local bus.

The operation modes of the normal and multimedia modes are switched by the CPU 11 and the like. That is, the CPU 11 reads attribute information from the PC card inserted in the PC card socket, and detects the type of inserted PC card on the basis of the attribute information. If the inserted PC card is a card corresponding to the multimedia mode, the CPU 11 switches the current mode of the PC card controller 17 to the multimedia mode. Setting of the IN or OUT state is also determined in accordance with the card type.

Next, the respective PC card interfaces in these normal and multimedia modes will be described with reference to FIGS. 2 to 4.

Figure 2:
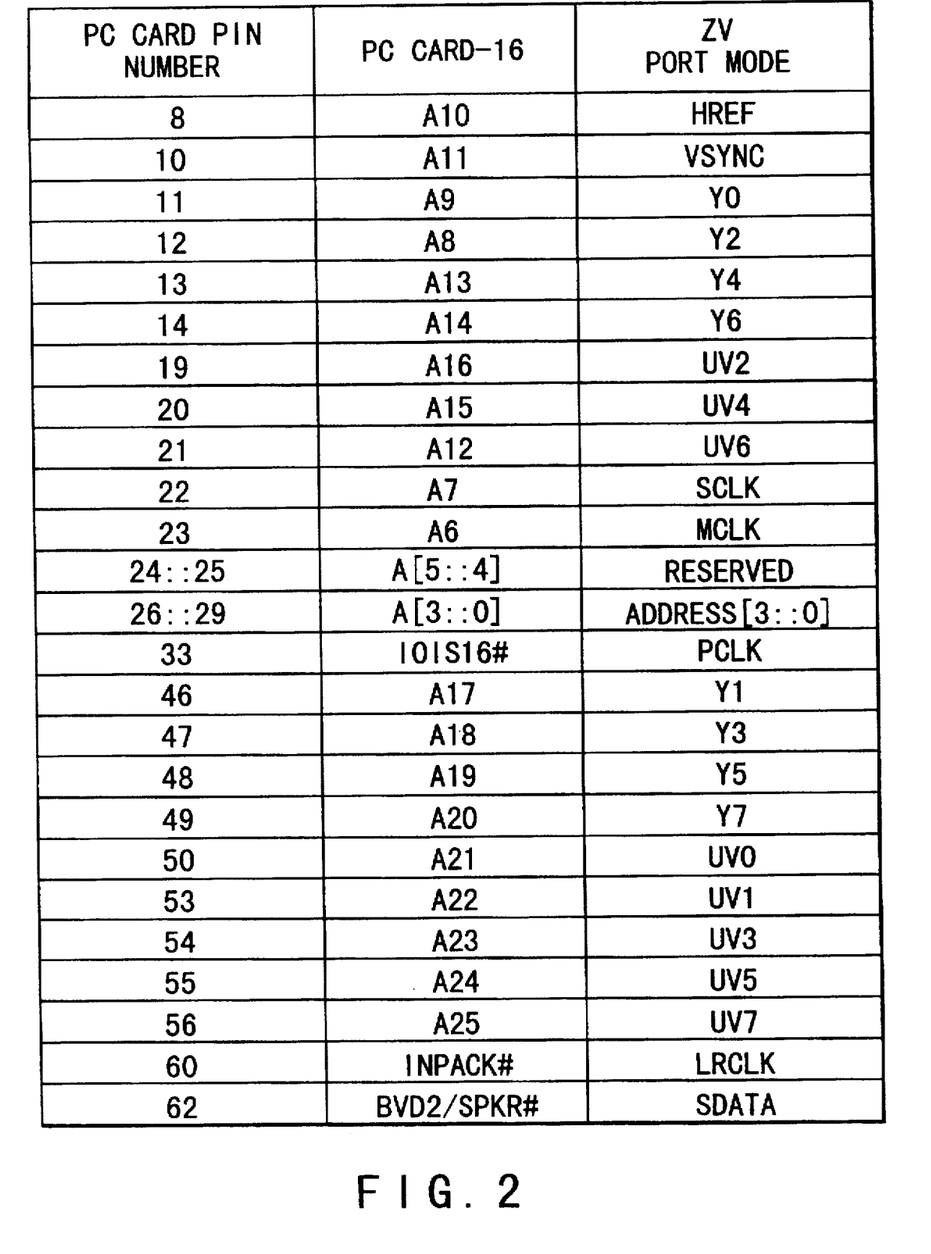
FIG. 2 is a table showing PC card interfaces in normal and multimedia modes for a 16-bit PC card used in the system of this embodiment.

FIG. 2 shows an interface for a 16-bit PC card. As shown in FIG. 2, in the normal mode, a PC card interface constituted by 68 pins is used in accordance with a standard pin assign rule defined by PCMCIA specifications.

On the other hand, in the multimedia mode, address pins (A25 to A7) and the like are used for output (or input) of image format data in the 4:2:2 format (digital YUV data: 8-bit luminance data Y and 8-bit color difference data UV), and output (or input) of horizontal and vertical synchronizing signals (HREF and VSYNC), a pixel clock (PCLK). An I/O port acknowledge pin (INPACK) prepared for an I/O card and an audio output line (SPKR) are used for output (or input) of audio data (SDATA) from a PC card, and output (or input) of a signal (LRCK) representing that the current audio data is output (or input) from the left or right channel. Pins on the PC card socket, which are used in the multimedia mode, are arranged as shown in FIG. 3.

Figure 4:
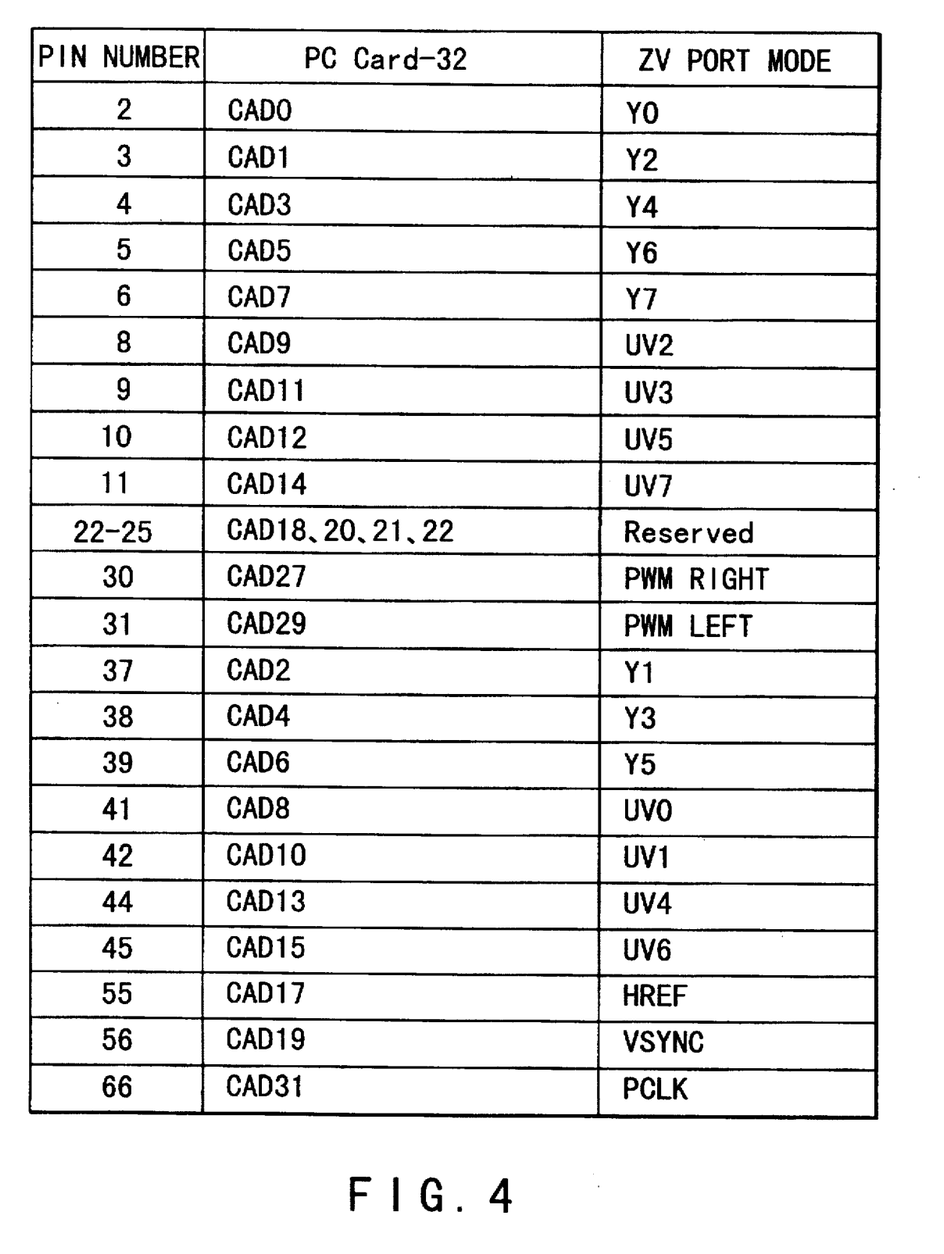
FIG. 4 is a table showing PC card interfaces in the normal and multimedia modes for a 32-bit PC card used in the system of this embodiment.

As for a 32-bit PC card, in the normal mode, a PC card interface constituted by 68 pins is used in accordance with a standard pin assign rule defined by Card Bus specifications, as shown in FIG. 4. On the other hand, in the multimedia mode, address/data lines (CAD0 to CAD15) are used for output (or input) of digital YUV data from the PC card, CAD17 and CAD19 are respectively used for output (or input) of horizontal and vertical synchronizing signals (HREF and VSYNC) from the PC card, and CAD21, CAD22, CAD27, and CAD 29 are respectively used for output (or input) of audio data (LRCLK and SDATA) from the PC card.

A pin related to video data, which is used in the multimedia mode, is called a video data pin, and a pin related to audio data is called an audio data pin hereinafter.

The hardware arrangement of the PC card device controller 17 will now be described with reference to FIG. 5.

The PC card device controller 17 comprises a PC card 16-ZV bridge 173, a PC card 32-ZV bridge 174, a PCI-I/O interface 176, a socket separator 178, an interface logic circuit 179 for the card socket A, an interface logic circuit 180 for the card socket B, a card I/O interface 186 for the card socket A, and a card I/O interface 187 for the card socket B.

The PC card 16-ZV bridge 173 is used in the multimedia mode. The PC card 16-ZV bridge 173 electrically connects a 16-bit PC card to the ZV port bus 4 in accordance with assignment of video/audio signal lines for the 16-bit PC card, shown in FIG. 2, such that a group of video/audio signal lines assigned to the interface for the 16-bit PC card inserted in the card socket A or B are connected in correspondence with a group of video/audio signal lines of the ZV port bus 4.

Similarly, the PC card 32-ZV bridge 174 is also used in the multimedia mode. The PC card 32-ZV bridge 174 electrically connects a 32-bit PC card to the ZV port bus 4 in accordance with assignment of video/audio signal lines for the 32-bit PC card, shown in FIG. 4, such that a group of video/audio signal lines assigned to the interface for the 32-bit PC card inserted in the card socket A or B are connected in correspondence with a group of video/audio signal lines of the ZV port bus 4.

The PCI-I/O interface 176 is an I/O buffer used for data transfer with respect to the internal PCI bus 2. The socket separator 178 selects which of the sockets is processed, on the basis of a switching instruction from the CPU 11.

The interface logic circuit 179 for the card socket A controls a PC card connected to the first card socket A. The interface logic circuit 179 comprises a PC card 16 controller 171, a PC card 32 interface 172, a multiplexer 181, a PCI-PC-card 16 bridge 182, a PCI-PC-card 32 bridge 183, a card interface data select circuit 184, a card detect circuit 185, and a switch circuit 188.

The interface logic circuit 180 for the card socket B controls a PC card connected to the second card socket B, and has the same hardware arrangement as that of the interface logic circuit 179.

The multiplexer 181 selects data from the 16-bit PC card and data from the 32-bit PC card in accordance with the detection result of the card detect circuit 185. The PCI-PC-card 16 bridge 182 controls data transfer between the PCI bus 2 and the 16-bit PC card. The PCI-PC-card 32 bridge 183 controls data transfer between the PCI bus 2 and the 32-bit PC card.

The PC card 16 controller 171 controls the 16-bit PC card inserted in the card socket so as to transfer data between the 16-bit PC card and the PCI bus 2. The PC card 32 interface 172 controls the 32-bit PC card inserted in the card socket so as to transfer data between the 32-bit PC card and the PCI bus 2. In this case, since an interface signal assigned to the 68-pin connector for the 32-bit PC card is equivalent to the PCI bus, the PC card 32 interface 172 basically controls only signal conversion between the 32-bit PC card and the PCI bus 2.

The switch circuit 188 performs switching control for connecting the PC card to the ZV port bus 4, the PCI bus 2, or a local bus 100. The switch circuit 188 incorporates two switch circuits for a 16-bit PC card and a 32-bit PC card. Each switch circuit selectively connects the PC card to the PCI bus 2, the ZV port bus 4, or the local bus 100 in accordance with the type of PC card (card associated or non-associated with the multimedia mode), the operation mode (normal mode or multimedia mode), and the like.

The card interface data select circuit 184 outputs data from the PC card to the switch circuit for a 16-bit PC card or a 32-bit PC card in the switch circuit 188 in accordance with the detection result of the card detect circuit 185. The card detect circuit 185 determines whether the connected PC card is a 16-bit PC card or a 32-bit PC card. This determination is performed on the basis of the combination of the states of 4 pins (pin 67, pin 36, pin 57, and pin 43) of the connected PC card.

In this arrangement, the two PC cards A and B can be selectively connected to the PCI bus 2, the ZV port bus 4, and the local bus 100 by switching connection by the two switch circuits 188. Therefore, video data, audio data, and the like can be directly transferred between the PC cards A and B without using the PCI bus 2 by connecting the respective PC cards A and B to the local bus 100.

Figure 5:
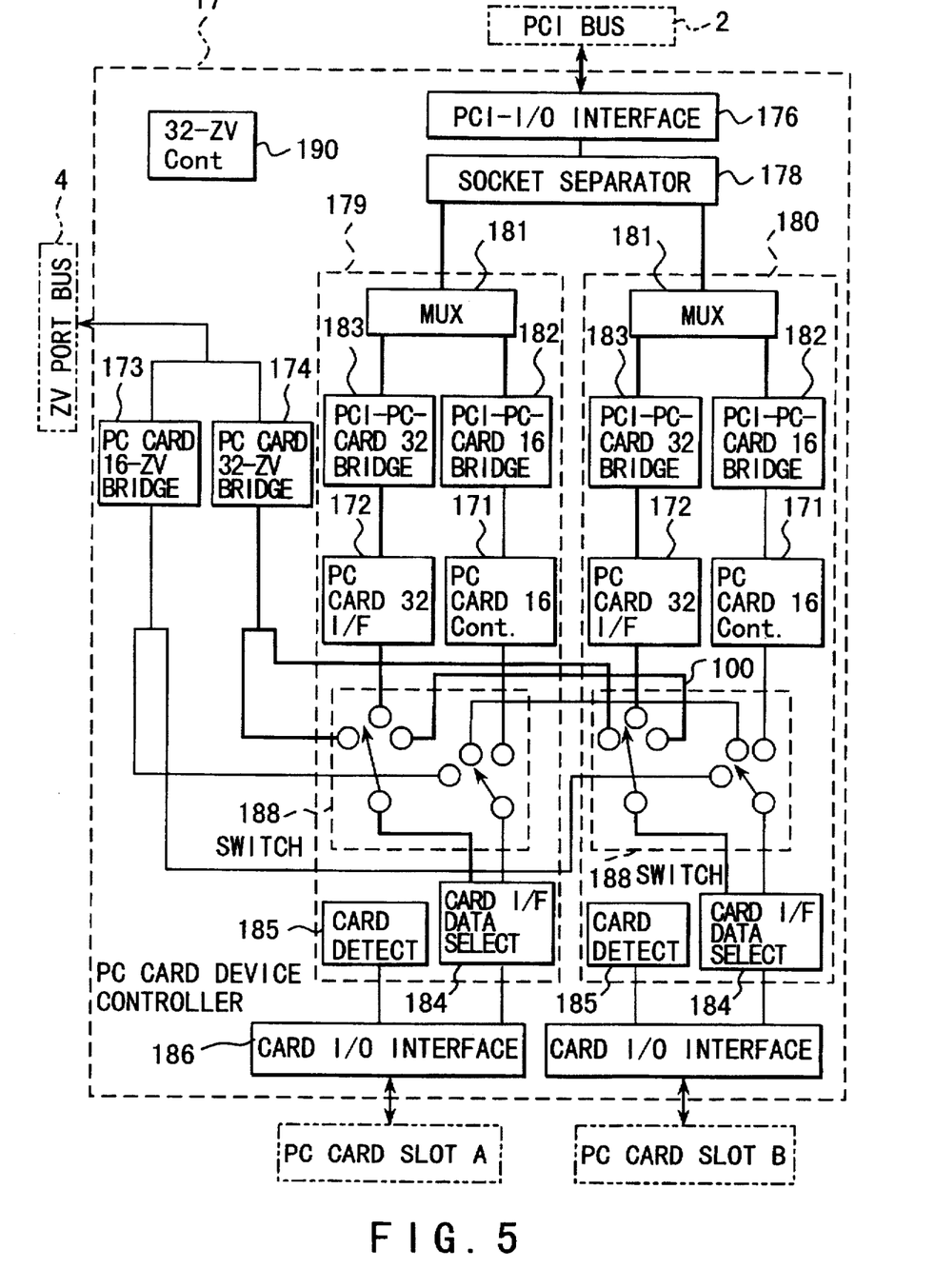
FIG. 5 is a block diagram showing an example of the detailed arrangement of a PC card device controller in the system of this embodiment.

Note that the thick lines in FIG. 5 represent 32-bit lines.

Figure 6:
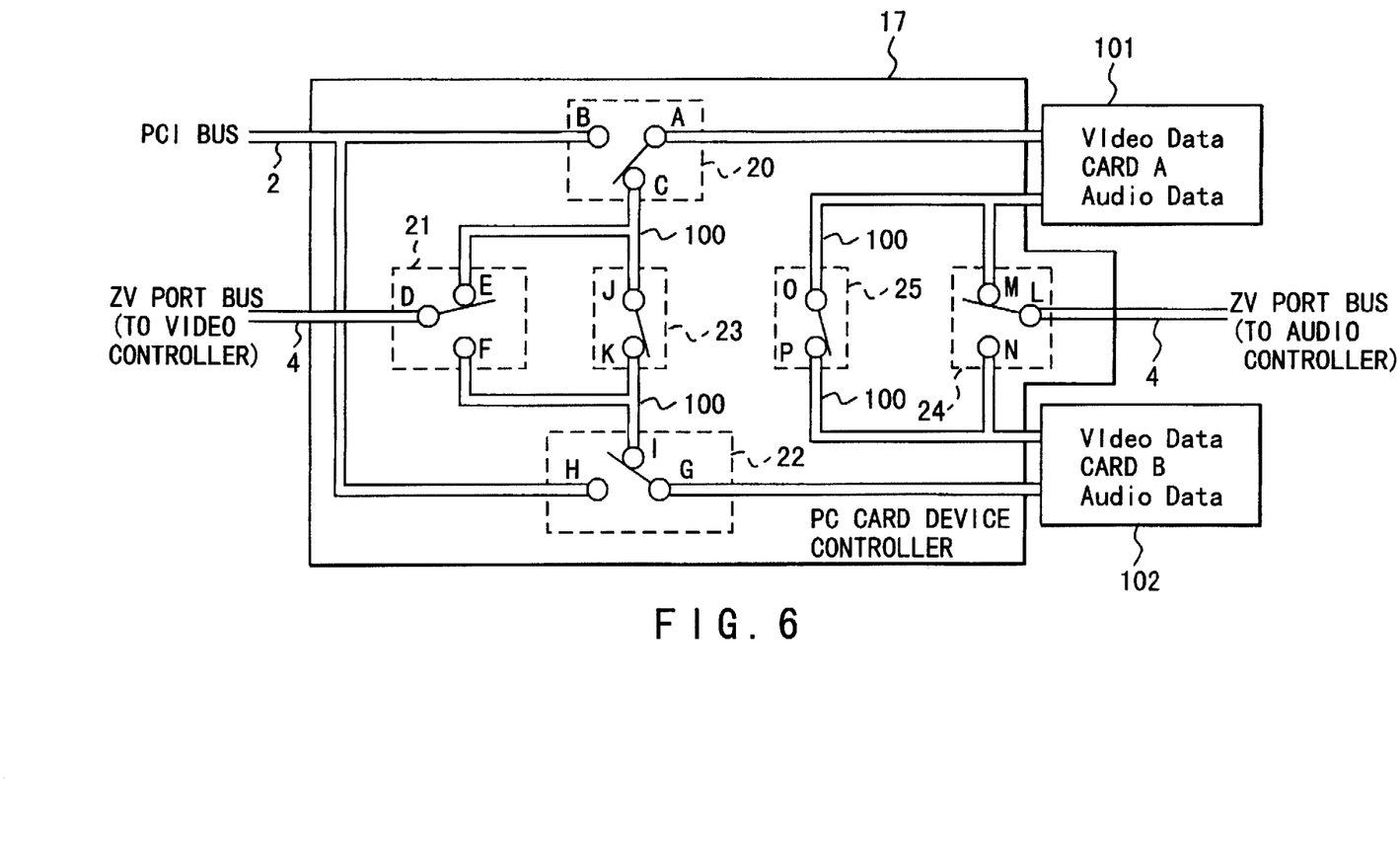
FIG. 6 is a block diagram showing the detailed arrangement of a switch circuit arranged in the PC card device controller of FIG. 5.

FIG. 6 shows a detailed example of each switch circuit 188. In this example, six bus switches 20 to 25 are used in order to enable simultaneous use of the ZV port bus 4 and the local bus 100 in the multimedia mode.

In FIG. 6, a portion related to data lines is mainly depicted to facilitate understanding of a flow of video data and audio data, and a portion related to control lines is not illustrated.

The bus switch 20 connects the video data pin of the card A to the PCI bus 2 or the local bus 100. In the normal mode, the bus switch 20 connects a terminal A to a terminal B, and in the multimedia mode, the bus switch 20 connects the terminal A to a terminal C.

Figure 8:
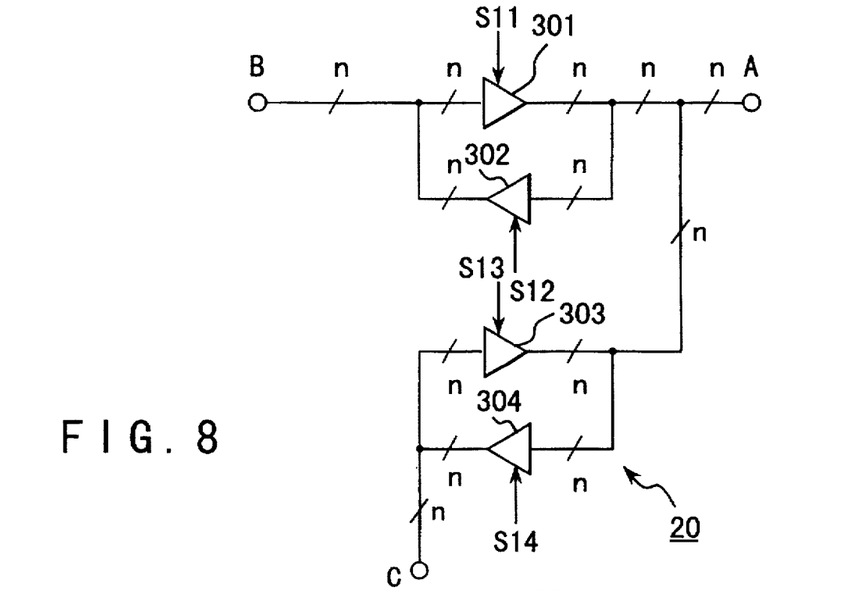
FIG. 8 is a circuit diagram showing the configuration of the second bus switch arranged in the switch circuit of FIG. 6.

The bus switch 20 is constituted by four 3-state buffers 301 to 304, which are connected as shown in FIG. 8. When corresponding control signals S11 to S14 are logic 1, the respective 3-state buffers 301 to 304 generate output signals of logic 1 or 0 in accordance with the logic 1 or 0 of the input signals. On the other hand, when the corresponding control signals S11 to S14 are logic 0, these outputs are in a high-impedance state. Therefore, the 3-state buffers 301 and 302 function as two-way switches between the terminals A and B, while the 3-state buffers 303 and 304 function as two-way switches between the terminals A and C. The connection switching state (two-way connection or separation between the terminals, one-way connection, and the data transfer direction in the one-way connection) by each two-way switch is determined on the basis of the combination of the logics of the corresponding control signals.

The bus switch 21 connects/disconnects the video data pins of the respective cards A and B to/from the video bus of the ZV port bus 4. In the normal mode, the bus switch 21 separates a terminal D from terminals E and F to separate both the cards A and B from the video bus of the ZV port bus 4. In the multimedia mode, the bus switch 21 connects the terminal D to the terminal E or F to connect one of the cards A and B to the video bus of the ZV port bus 4.

Figure 9:
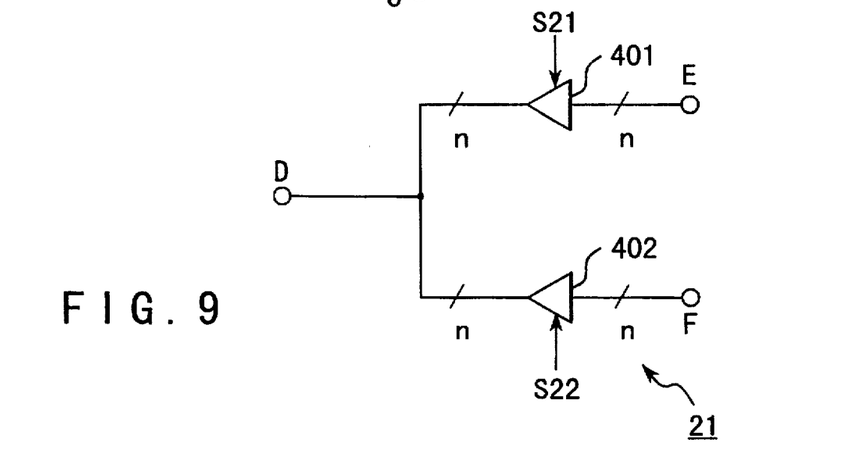
FIG. 9 is a circuit diagram showing the configuration of the third bus switch arranged in the switch circuit of FIG. 6.

The bus switch 21 can be constituted by two 3-state buffers 401 and 402 connected as shown in FIG. 9. When corresponding control signals S21 and S22 are logic 1, the respective 3-state buffers 401 and 402 generate output signals of logic 1 or 0 in accordance with the logic 1 or 0 of the input signals. On the other hand, when the corresponding signals S21 and S22 are logic 0, the outputs are in a high-impedance state. Therefore, the 3-state buffer 401 functions as a switch for permitting or inhibiting one-way connection of the terminal E to the terminal D, while the 3-state buffer 402 functions as a switch for permitting or inhibiting one-way connection of the terminal F to the terminal D.

The bus switch 22 connects the video data pin of the card B to the PCI bus 2 or the local bus 100. In the normal mode, the bus switch 22 connects a terminal G to a terminal H, and in the multimedia mode, the bus switch 22 connects the terminal G to a terminal I. The bus switch 22 can be realized by the same arrangement as that of the bus switch 20.

The bus switch 23 connects/disconnects the video data pins of the cards A and B to/from each other via the local bus 100. In the normal mode, the bus switch 23 separates a terminal J from a terminal K to separate connection between the video data pins of the cards A and B via the local bus 100. In the multimedia mode, the bus switch 23 connects the terminal J to the terminal K to connect the video data pins of the cards A and B to each other.

Figure 7:
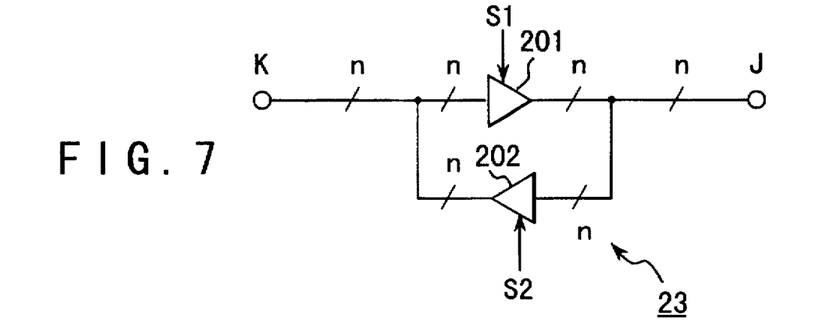
FIG. 7 is a circuit diagram showing the configuration of the first bus switch arranged in the switch circuit of FIG. 6.

The bus switch 23 can be constituted by two 3-state buffers 201 and 202 connected as shown in FIG. 7. When corresponding control signals S1 and S2 are logic 1, the respective 3-state buffers 201 and 202 generate output signals of logic 1 or 0 in accordance with the logic 1 or 0 of the input signals. On the other hand, when the corresponding signals S1 and S2 are logic 0, the outputs are in a high-impedance state. Therefore, the 3-state buffers 201 and 202 function as two-way switches between the terminals J and K. The connection switching state (two-way connection or separation between the terminals, one-way connection, and the data transfer direction in the one-way connection) is determined on the basis of the combination of the logics of the control signals S1 and S2.

The bus switch 24 connects/disconnects the audio data pins of the cards A and B to/from the audio bus of the ZV port bus 4. In the normal mode, the bus switch 24 separates a terminal L from terminals M and N to separate both the cards A and B from the audio bus of the ZV port bus 4. In the multimedia mode, the bus switch 24 connects the terminal L to the terminal M or N to connect one of the cards A and B to the audio bus of the ZV port bus 4. The bus switch 24 is realized by the same arrangement as that of the bus switch 21.

The bus switch 25 connects/disconnects the audio pins of the cards A and B to/from each other via the local bus 100. In the normal mode, the bus switch 25 separates a terminal O from a terminal P to separate connection between the audio pins of the cards A and B via the local bus 100. In the multimedia mode, the bus switch 25 connects the terminal O to the terminal P to connect the audio pins of the cards A and B to each other. The bus switch 25 is realized by the same arrangement as that of the bus switch 23.

Figure 10:
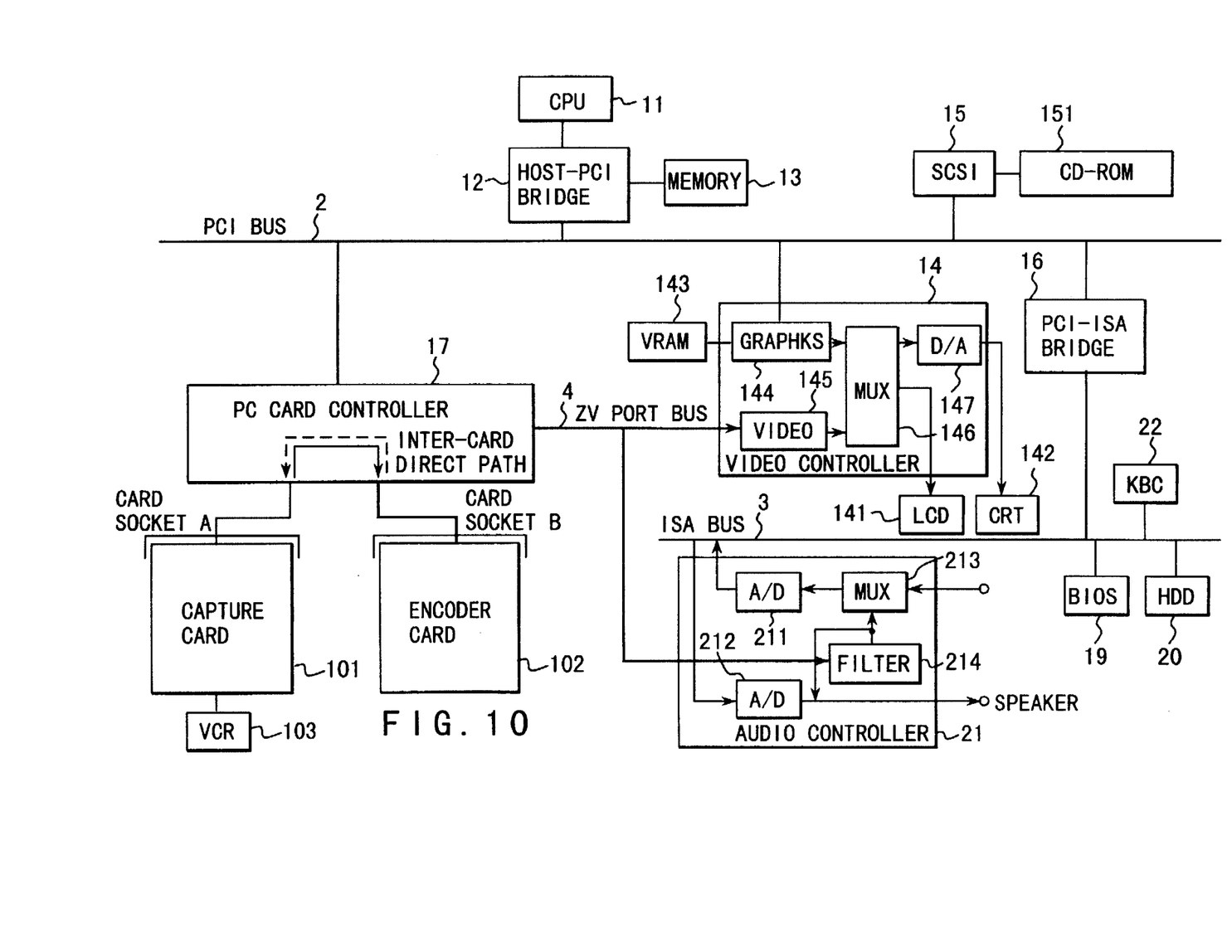
FIG. 10 is a block diagram showing an example of the arrangement of a moving image encoder system using the system in FIG. 1.

The bus switching operation by the switch circuit in FIG. 6 will be described by exemplifying a case wherein this system is applied to a moving image encoder system as shown in FIG. 10.

In the moving image encoder system of FIG. 10, the card sockets A and B in FIG. 1 respectively receive a video capture card for receiving a video/audio signal in the NTSC format from an external video cassette recorder (VCR) 103, digitizing the signal, and outputting the digitized signal, and a MPEG encoder card for compressing and encoding the digitized video/audio data.

In this case, the operation of the switch circuit in FIG. 6 is as follows.

More specifically, first of all, both the card sockets A and B are set in the normal mode. At this time, as for the capture card as the card A inserted in the card socket A, the terminal A is connected to the terminal B, and the terminal M is separated from the terminal L. As for the encoder card as the card B inserted in the card socket B, the terminal G is connected to the terminal H, and the terminal N is separated from the terminal L. Further, the terminal J is separated from the terminal K, and the terminal O is separated from the terminal P.

The OUT attribute of the multimedia mode is set for the card socket A, and the IN attribute of the multimedia mode is set for the card socket B.

At this time, as for the video data path, the connection destination of the terminal A is switched from the terminal B to the terminal C, the terminal D is connected to the terminal E, the terminal J is connected to the terminal K, and the terminal I is connected to the terminal G. With this setting, video data from the capture card as the card A inserted in the card socket A are transferred to the video data pin of the encoder card via the local bus 100, and at the same time transferred to the video controller 14 via the ZV port bus 4. The encoder card reads in digital YUV data from the capture card in synchronism with VSYNC, HREF, and PCLK included in the video data from the capture card.

As for the audio data path, the terminal L is connected to the terminal M, and the terminal O is connected to the terminal P. With this setting, audio data from the capture card as the card A inserted in the card socket A are transferred to the audio pin of the encoder card via the local bus 100, and at the same time transferred to the audio controller 21 via the ZV port bus 4.

The connection switching state (two-way connection or separation between the terminals, one-way connection, and the data transfer direction in the one-way connection) of each bus switch is determined on the basis of the mode (normal or multimedia) and the IN or OUT attribute in the multimedia mode. When the IN attribute is set for the card socket A, and the OUT attribute is set for the card socket B, data can be transferred from the card B to the card A via a flow reverse to that of the above-described data transfer.

Figure 11:
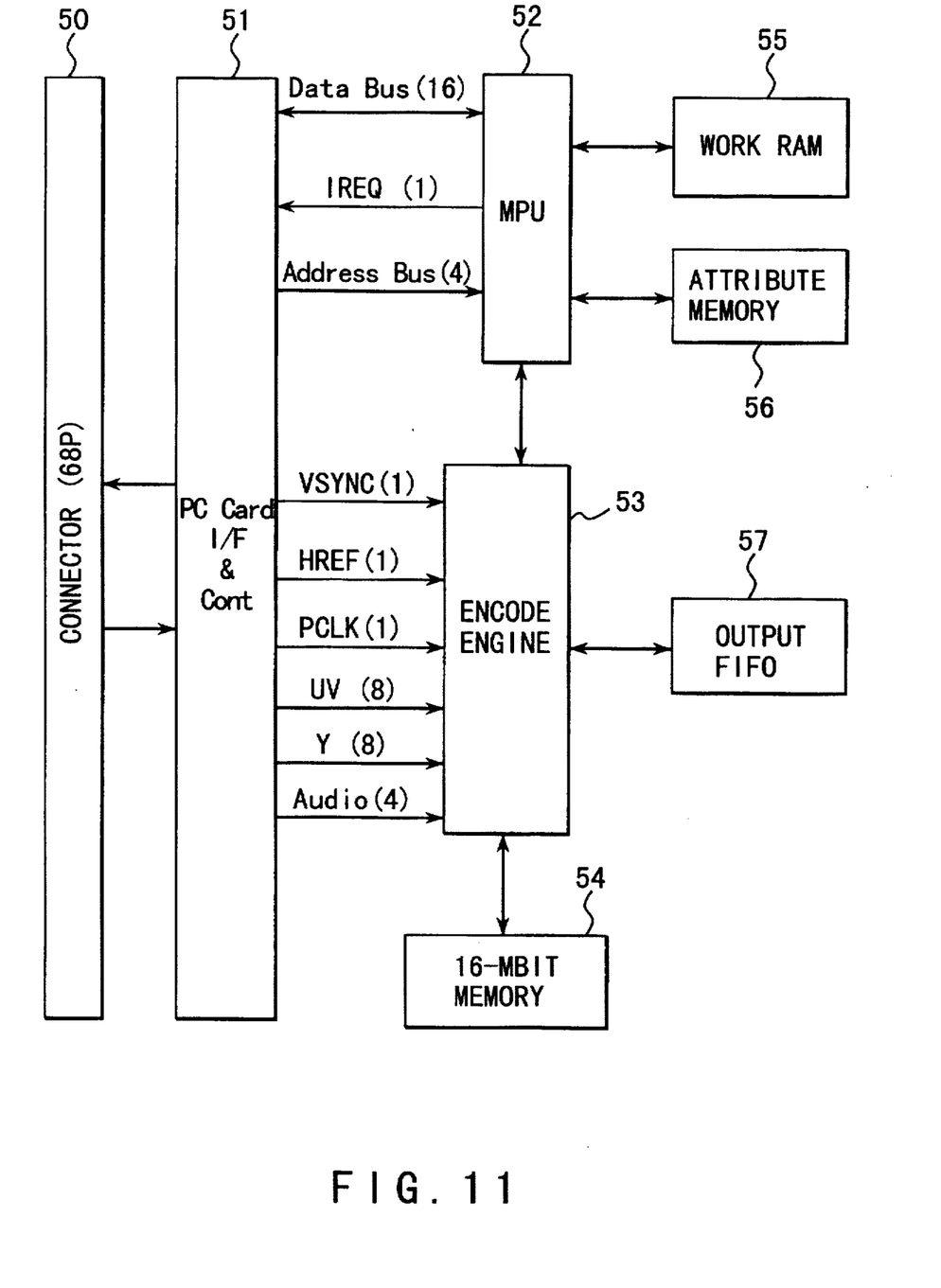
FIG. 11 is a block diagram showing an example of the detailed arrangement of an encoder card used in the moving image encoder system of FIG. 10.

FIG. 11 shows an example of the detailed arrangement of the encoder card.

A MPU 52 determines the overall operation of the encoder card, and an encode engine 53 compresses and encodes moving image data. The upper 8 bits of a data bus from the MPU 52 are for reading encoded data from the CPU 11, and the lower 8 bits are a two-way data bus. A RAM 55 is used as a work area for the MPU 52. An attribute memory 56 is a ROM storing card attribute information. An output FIFO 57 is used as a storage destination of data encoded by the encode engine 53. When a predetermined value is set in a status register, encoded data are read from the FIFO 57. A 16-Mbit memory 54 is used as a frame data storage and a work area by the encode engine 53.

Figure 12:
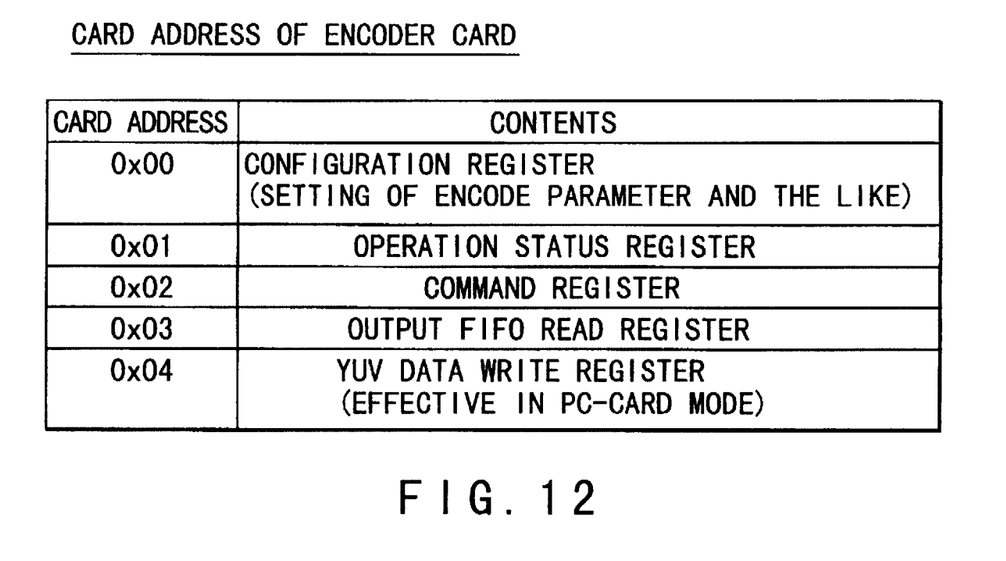
FIG. 12 is a table showing the relationship between the card addresses and registers of the encoder card in FIG. 11.

This encoder card has card addresses, and its operation is determined by setting data at a card address by the CPU 11. FIG. 12 shows the card addresses of the encoder card.

Figure 13:
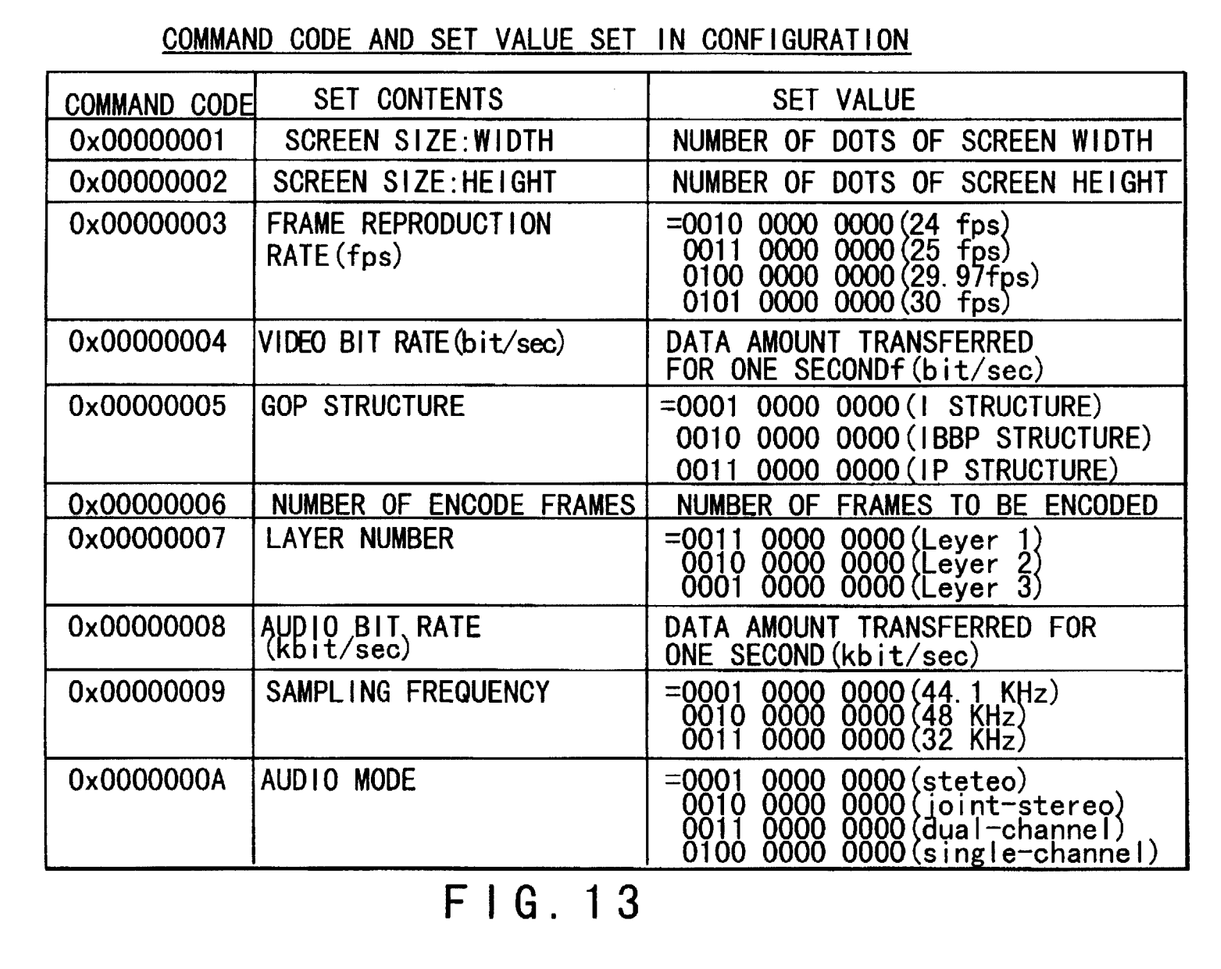
FIG. 13 is a table for explaining the configuration register of the encoder card in FIG. 11 and its set values.

Data setting to a configuration register having a card address of 0x00 is performed by writing a command code (32 bits) in the register in units of bytes, and subsequently writing various set values (32 bits) from the MSB side in units of bytes. When all the set items listed in FIG. 13 are set, D15 and D14 of the command code 0x00000000 in the status register are set to 1. If 0x00000002 is written in the command register, an encode operation is started.

If 0x00000003 is written, the encode operation in progress is stopped; if 0x00000004 is set, the encode operation is temporarily stopped; and if 0x00000001 is written, the encoder card is initialized. If 1 is set in the bit D13 of the command code 0x00000000 in the status register, the CPU 11 can transfer encoded data from a memory read register to the memory 13. Simultaneously when 0 is set in the D13, IREQ in FIG. 11 changes to 0, and an interrupt is sent to the CPU 11. At this time, encoded data can be read from the card and transferred to the memory 13 via an interrupt routine.

Figure 3:
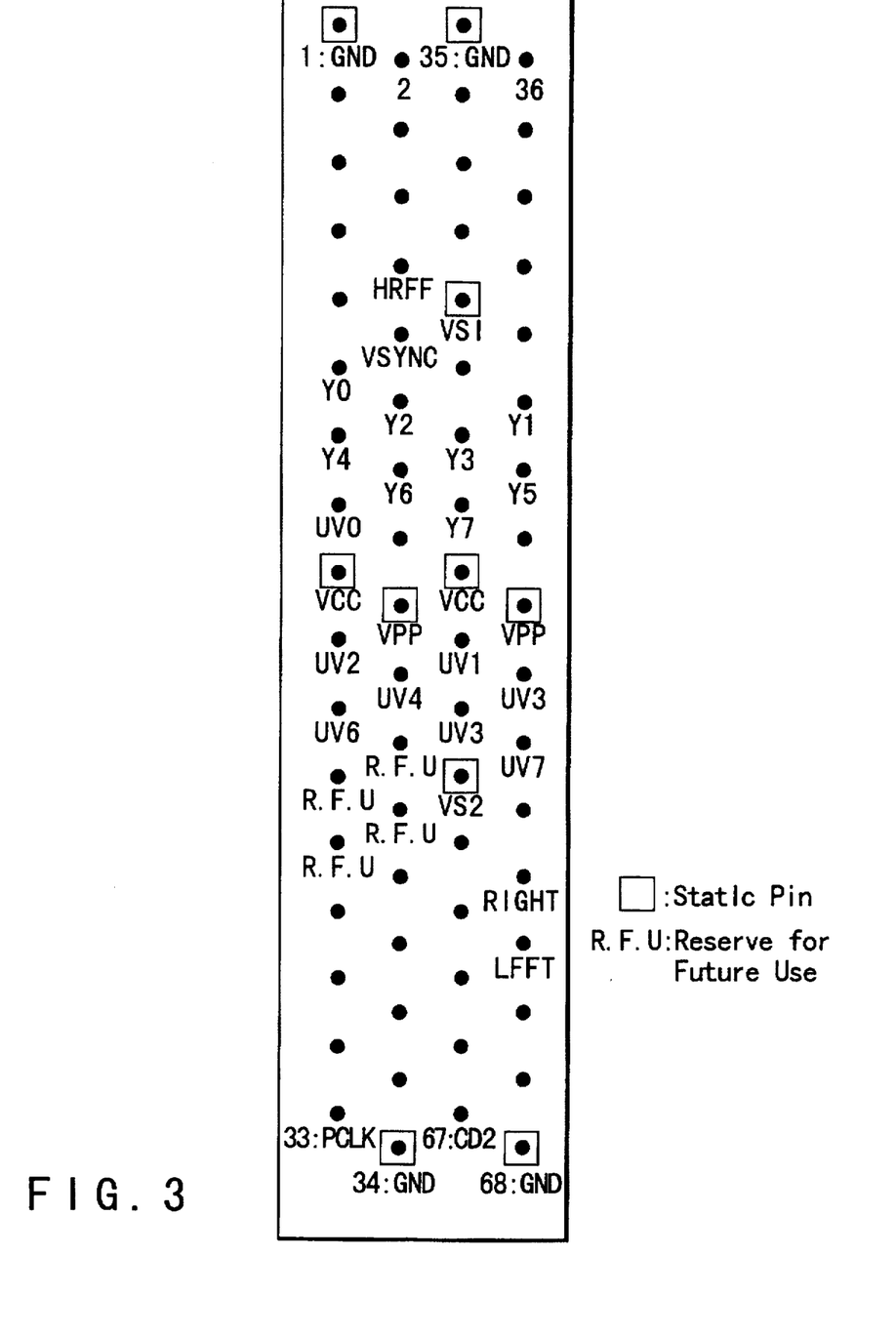
FIG. 3 is a view showing the pin assignment of the multimedia mode for the PC card used in the system of this embodiment.

In the multimedia mode, the encoder card asynchronously receives Y (8 bits) and UV (8 bits) in accordance with the pin assignment shown in FIG. 3. The encode engine 53 reads the asynchronously input moving image data by using the timings of VSYNC, HREF, and PCLK.

As described above, in this embodiment, the local bus 100 for directly connecting the first and second two card sockets A and B to each other is provided in addition to the ZV port bus 4. In the multimedia mode, video data and the like can be directly transferred between PC card devices via the local bus 100 without the mediacy of the system bus. Therefore, a computer system suitable for construction of a video processing system using PC cards, particularly of a moving image encoder system can be realized.

In this embodiment, the ZV port bus 4 and the local bus 100 are provided to the PC card device controller 17. However, they may be provided between the PC card device controller 17 and the card sockets.

As has been described above, according to the present invention, video data and the like can be directly transferred between PC cards without the mediacy of the system bus. In construction of a video processing system using a plurality of PC cards, and particularly transfer of original image data to a real-time encoder and construction of a coding transmission module for images and voices in a video conference system, these performances do not depend on the system bus, and the load of the CPU can be reduced.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, the above embodiment exemplifies the case wherein data are transferred between PC cards. The present invention is not limited to the case of the PC cards and can be applied to data transfer between devices as far as the devices are of the same type.

What is claimed is:

1. A computer system having first and second card sockets respectively capable of receiving card devices, comprising:

a system bus; and a card device controller connected to said system bus to control said card devices respectively inserted in said first and second card sockets, said card device controller including switch means capable of electrically connecting said first card socket to said second card socket.

2. A computer system having first and second card sockets respectively capable of receiving card devices, comprising:

a system bus; and a card device controller connected to said system bus to control said card devices respectively inserted in said first and second card sockets, said card device controller including switch means capable of switching between a first mode for electrically connecting at least one of said first card socket and said second card socket to said system bus, and a second mode for electrically connecting said first card socket to said second card socket.

3. A computer system having first and second card sockets respectively capable of receiving card devices handling video/audio data, comprising:

a system bus;

a video/audio bus for transferring the video/audio data; and a card device controller connected to said system bus and said video/audio bus to control said card devices respectively inserted in said first and second card sockets, said card device controller including switch means capable of switching between a first mode for forming a path to electrically connect at least one of said first card socket and said second card socket to said system bus, and a second mode for forming a path to electrically connect one of said first and second card sockets to said video/audio bus.

4. A system according to claim 3, wherein said card devices respectively inserted in said first and second card sockets have attribute data representing one of the first and second modes.

5. A system according to claim 4, further comprising means for setting said switch means to a corresponding one of the first and second modes with reference to the attribute data of said card devices respectively inserted in said first and second card sockets.

6. A system according to claim 5, wherein each of said card devices respectively inserted in said first and second card sockets has attribute data representing one of input and output modes related to input/output of data.

7. A system according to claim 6, further comprising means for setting each of said cards to a corresponding one of the input and output modes with reference to the attribute data of said card devices respectively inserted in said first and second card sockets.

8. A system according to claim 3, wherein a card device inserted in one of said first and second card sockets is a video capture card for receiving an externally input video/audio signal, digitizing the video/audio signal, and outputting the digitized video/audio signal.

9. A system according to claim 8, wherein said card device inserted in one of said first and second card sockets is an encoder card for compressing and encoding the digitized video/audio data.

10. A system according to claim 9, wherein said switch means has means for transmitting the video/audio data from said video capture card to said encoder card and said video/audio bus in the second mode.

11. A system according to claim 3, wherein said switch means has a two-way transmission circuit capable of switching a direction of data transferred between said first and second card sockets.

12. A system according to claim 11, wherein said two-way transmission circuit has two 3-state buffers arranged parallel in directions different from each other.

13. A system according to claim 3, wherein said card device controller comprises a 16-bit circuit for controlling a 16-bit card device, and a 32-bit circuit for controlling a 32-bit card device.

14. A system according to claim 13, wherein said card devices respectively inserted in said first and second card sockets have attribute data representing one of a 16-bit type and a 32-bit type.

15. A system according to claim 14, further comprising means for driving a corresponding one of said 16-bit and 32-bit circuits with reference to the attribute data of said cards respectively inserted in said first and second card sockets.

16. A system according to claim 3, wherein said video/audio bus is a ZV (Zoomed Video) port bus.

17. A system according to claim 3, further comprising:
a video controller for controlling the video data transferred from said video/audio bus.

18. A system according to claim 17, further comprising:
an audio controller for controlling the audio data transferred from said video/audio bus.

* * * * *